UNITED STATES PATENT OFFICE.

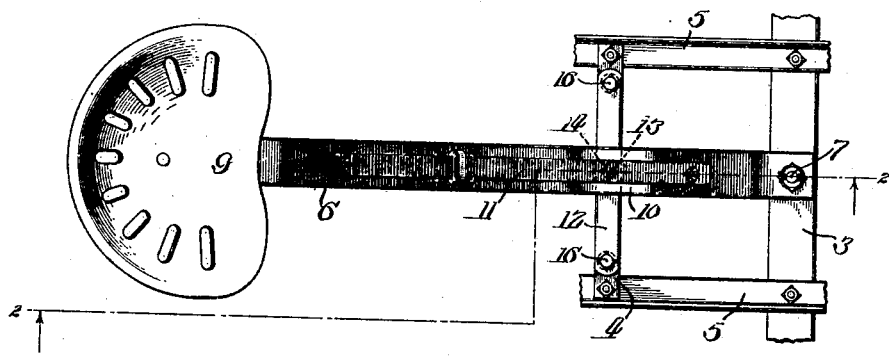

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

SEAT-SUPPORT.

1,198,296.  Specification of Letters Patent.  Patented Sept. 12, 1916.

Application filed January 10, 1914. Serial No. 811,375.

*To all whom it may concern:*

Be it known that I, LEWIS E. WATERMAN, a citizen of the United States, residing at Rockford, in the county of Winnebago and the State of Illinois, have invented certain new and useful Improvements in Seat-Supports, of which the following is a specification.

This invention pertains to seat-supports, such as are used on various vehicles and especially on farm implements and machinery.

The primary object of my invention is to provide a seat-support of improved construction, wherein the seat-bar is mounted on spring means arranged in a peculiar manner and whereby the seat-bar has no fixed pivotal connection with a frame, so that when the seat end of the seat-bar is depressed, the said bar will swing not from a fixed pivotal axis, but upon a plurality of spring mountings, thus insuring effective cushioning of vibratory motions imparted from the frame.

Another object is to provide a seat-bar spring mounting, simple in structure, compact in arrangement, and such that with a small outlay of parts arranged in a practical manner, a thoroughly effective resiliency will be obtained to cushion the severe vibratory motions imparted to a seat-bar, and whereby the seat-bar may be manufactured at a low cost.

In the accompanying drawings: Figure 1 is a plan view of my improved seat-support. Fig. 2 is a side view thereof, partly in vertical section as taken on the line 2—2 of Fig. 1.

My improved seat-support is intended particularly for use on riding agricultural implements, and in certain of these implements it is customary to provide a seat-bar that is attached at one of its ends to the implement frame, to extend the seat-bar upwardly and rearwardly therefrom and to connect a seat at the outer end of the seat-bar. Also, in certain agricultural implements an incessant vibration is set up during operation thereof by the nature of the work performed thereby; and for obviating the perceptibility to the operator of such vibration I provide a seat-support retaining the well known form of support member and mount same by a novel method including, spring means actional upon opposite faces of the seat-bar and at points transversely spaced from said bar.

A fragmentary portion of an implement frame is shown comprising, two spaced cross-bars 3 and 4 and two spaced side-bars 5—5 attached fixedly thereto.

The seat-bar 6 is disposed transverse to cross-bars 3 and 4, is connected at one end to the cross-bar 3 by a spring connection comprising a bolt 7 extending vertically through cross-bar 3 and an aperture in the said end of the bar 6 and having a spiral spring 8 mounted thereon intermediate the top of bar 6 and a nut on said bolt, so that said bar end is movable upward against the tension of said spring; and attached to the opposite end of bar 6 is a seat 9. The bar 6 extends from said spring connection rearwardly relative to the implement, inclined upwardly, and is formed with a non-inclined portion 10 located above cross-bar 4. A tension brace 11 connects the two inclined portions of the bar 6. A cross-bar 12 is connected through a vertical bolt 13 to the under side of the non-inclined portion 10 of the seat-bar, being located directly above the frame cross-bar 4, and the cross-bar 12 and portion 10 are fixedly connected by the screw-heads 14 which lock the two together, the bolt 13 being extended downward through an aperture in cross-bar 4 and having a head at the down side thereof. A spiral spring 15 is mounted on bolt 13 intermediate the top of cross-bar 4 and the lower nut 14 to tensionally resist downward movement of the seat-bar. The cross-bar 12 which is transverse to the seat-bar 6 has each of its opposite ends in connection with the frame cross-bar 4 by spring-bolt connections 16 of a construction similar to that of bolt 13 and spring 15.

With the weight of a person upon the seat, the seat-bar will rock downwardly from its mounting at the cross-bar 12, its opposite end rising, this movement being warrantable by the yieldable mounting of said end upon bolt 7, and the spring mounting at the cross-bar 12 will yield under the weight and cushion the down movement of the seat. This application of spring resistance to a seat-support of this character at all of its points of support renders to the seat-support a free and easy movement and such that instantly absorbs vibrations thereof. By the spring mountings transversely spaced from the seat-bar all lateral vibrations are resisted, and at the same time this structure braces the seat-support laterally to allow for its movable suspension and to care for torsional strains to the bar.

In the use of the word "seat-bar" in the claims it should be understood that I do not limit myself to those of a single bar structure, as shown in the drawings, since it is obvious that seat-supports of this general type may be constructed of a pair of parallelly arranged bars or of a suitable built-up structure.

I claim as my invention:

1. A seat mounting for agricultural implements comprising a seat bar equipped at one end with a seat, means yieldingly supporting the seat bar at its other end and intermediate its ends at points laterally spaced from and on opposite sides of the seat bar so that the seat supporting means may move vertically relatively to the frame at said points of support to resiliently cushion depression and twisting or torsional movement of the seat bar.

2. The combination of a frame, a seat bar equipped at one end with a seat and intermediate its ends with oppositely extending lateral projections, a spring connection between the outer end of each of said lateral projections and the frame, and means securing the end of the seat bar opposite its seat-equipped end to the frame in a manner to allow twisting or torsional movement of the seat bar relatively to the frame, said spring connections being adapted to function independently to cushion this movement.

3. The combination of a frame, a seat bar equipped at one end with a seat, a loose spring-bolt connection between the end of the seat bar and the frame permitting this end to be movable vertically and rock on a longitudinal axis with respect to the frame, an arm connected with and extending laterally from each side of the seat bar intermediate the ends thereof, and a spring-bolt connection between the outer end of each of said arms and the frame, said spring-bolt connections providing a three-point support for the seat bar independently yieldable at each point of support.

In testimony whereof I have hereunto set my hand in presence of two subscribing witnesses.

LEWIS E. WATERMAN.

Witnesses:
JOHN F. McCANNA, Jr.,
E. D. E. N. BEHEL.

Copies of this patent may be obtained for five cents each, by addressing the "Commissioner of Patents. Washington, D. C."